Feb. 24, 1959     A. B. DAVIDSON     2,875,151

PROCESS FOR TREATMENT OF SEWAGE

Filed April 22, 1952

*INVENTOR.*
ALEX B. DAVIDSON

BY DES JARDINS, ROBINSON & KEISER

*Howard L. Keiser*

HIS ATTORNEYS

2,875,151

PROCESS FOR TREATMENT OF SEWAGE

Alex B. Davidson, Cincinnati, Ohio, assignor to Schenley Industries, Inc., New York, N. Y., a corporation of Delaware Application April 22, 1952, Serial No. 283,546

8 Claims. (Cl. 210—4)

This invention relates to a new and useful process for the purification of sewage and, more particularly, to a more efficient and economical means of treating sewage or other liquids containing pollutional materials than the activated sludge process, or other presently known methods of treatment.

There are two principal types of treatment in common use today for effecting treatment of sewage, it being understood that wherever the term "sewage" is used hereinafter in this specification and in the claims, it is intended to include not only domestic waste, but also industrial waste and/or other liquids containing pollutional materials. In general, both of these methods involve settling the sewage in clarification tanks; treating the clear effluent from the clarification tanks by some aerobic biological method; settling the effluent from the biological process, and then discharging the clear effluent from the final settling tanks to the stream or other disposal medium. The biological portion of the process can be either of two types. One type, the trickling filter method, allows the sewage to trickle down through a bed of stone whereby the organic material therein is oxidized by the action of biologic slimes on the stone. The other method is the activated sludge process in which the liquid sewage is aerated and agitated by compressed air or mechanical means together with the activated sludge returned from the settlement tanks. The process of the present invention is related in a general way to the activated sludge process and the latter process will therefore be described more fully.

In the activated sludge process, the sewage is usually first settled in a clarification tank where the heavier solids settle out leaving a relatively clear effluent which overflows to the aeration units. These aeration units generally consist of tanks equipped with air diffusers located in the bottom thereof which continuously aerate the liquid in the tanks. Alternatively, the sewage may be aerated by mechanical aerators which continuously agitate the liquid sewage contained in the aeration tanks. The usual period of aeration in these tanks is from 6 to 8 hours. The liquor in the aeration tanks consists of a mixture of the effluent from the primary clarifiers and return activated sludge. The return activated sludge is obtained from the final clarifier where it is settled out of the "mixed liquor" from the aeration tanks and then returned to the aeration tanks along with the effluent from the primary clarifiers. This activated sludge is built up from the organisms and waste materials contained in the liquid itself by continued aeration and, when such a disposal plant is started, it generally takes from two to four weeks to build up sufficient activated sludge. The sludge consists of flocculent solids maintained in suspension and in an aerobic condition and is full of bacterial organisms and other living matter which aid in effecting the oxidation of the pollutional material in the sewage. The sludge returned to the aeration tanks generally amounts to about 20% by volume of the incoming raw sewage. It has generally been believed that this return sludge must be kept in an aerobic condition or it becomes "sick" and will not effectively perform its purification function.

Another method of treatment is anaerobic digestion which is sometimes used to treat a very strong sewage and is also used for the digestion of sludge settled out of sewage in the conventional aerobic process. In the anaerobic process, the sewage is fed into a closed tank which may or may not be heated, depending upon the temperature of the sewage delivered to the disposal plant. After the sewage has been sufficiently digested and compacted, a portion of it is then flushed or pumped to sand beds or vacuum filters for drainage and final disposal.

In the anaerobic digestion process, the organic material decomposes anaerobically to give methane, carbon dioxide and hydrogen sulfide gases. The process is generally supposed to be considerably slower than aerobic methods of treatment and it is generally believed that although both anaerobic digestion and aerobic decomposition methods are dependent upon bacterial organisms for their reaction, entirely different types of bacteria are involved in the two different methods. The previous theory has been that these bacteria cannot be interchanged, that is, that an anaerobic process cannot be allowed to become aerobic and vice versa. It has always been the belief also that the sludge from the anaerobic process and "activated sludge" are totally incompatible and that, in an activated sludge plant, an overdose of anaerobic material or sludge will de-activate the activated sludge, making it "sick," and thereby render the process inoperative. In fact, the literature is replete with references to the danger of permitting anaerobic waste to enter the activated sludge system in too great a quantity, and it has become a more or less accepted fact that the entrance of too much anaerobic waste into the actively operating activated sludge treatment plant will seriously interfere with the operation of the process by overloading it and making the activated sludge "sick."

Contrary to this belief that an anaerobic process cannot be allowed to become aerobic, and vice versa, I have found that it is possible to actually combine the two systems, i. e., the aerobic and anaerobic methods of sewage treatment, with the following results: a better and more efficient sewage treatment method is obtained; the process resulting from this combination of aerobic and anaerobic treatments is more reliable and much less likely to become upset than the activated sludge system; the initial cost of construction of the plant required to carry out the process is less than in the case of conventional methods of treatment; the problem of sludge return is simplified, and there is practically no "build up" of sludge in the system, thereby eliminating the problem of sludge disposal.

In my novel method of sewage treatment, the anaerobic and aerobic processes are utilized in conjunction with one another to purify the raw sewage introduced into the disposal plant. According to one method, I introduce the influent or raw sewage into an anaerobic digestor where it is decomposed anaerobically. The digestor used in this process may be heated or unheated as may be necessary to best carry out the anaerobic digestion. The effluent, or slurry, from the anaerobic digestor is then passed to an aeration tank where it is aerated in a manner similar to that employed in the activated sludge system. The effluent from this tank is settled so that the final effluent is free of suspended solids. The settlings, or sludge, from the settled effluent are then returned wholly or in part to the anaerobic digestor for treatment along with the raw sewage being introduced therein.

According to a second method, the raw sewage is first processed aerobically in an aeration tank after which the effluent from this tank is passed to an anerobic digestor where the waste is decomposed anaerobically. The effluent from the digestor is then settled so as to remove suspended solids from the final effluent. The sludge from the settlement basin is then returned to the aeration tank either wholely or in part.

It will be seen that both of these methods involve the complete interchange of the sewage being treated from anaerobic conditions to aerobic conditions, or vice versa, and the return and interchange of sludge with the raw sewage. From this it would seem apparent that the bacteria involved in the reduction are facultative bacteria which can perform their function either anaerobically or aerobically, or if aerobes or anaerobes, that they receive unusual stimulation. This might explain the successful results achieved through a combination of the anaerobic and aerobic treatments of the sewage.

Accordingly, it is an object of the present invention to provide a new and useful process for the treatment of sewage in which the waste is subjected to both anaerobic and aerobic treatments successively. While this combination of the anaerobic and aerobic processes in the treatment of sewage is at variance with all past theories on the subject, remarkable results have been achieved by combining these two types of treatment, although this is contrary to what might be expected according to the teachings of the prior art.

Another object of the invention is to provide a novel method of sewage treatment in which the raw sewage is first subjected to anaerobic digestion and then to aerobic decomposition with a return of the aerobic sludge to the raw sewage being subjected to anaerobic digestion.

Another object is to materially reduce the time required for the purification of sewage.

Another object is to provide a method of sewage purification which is more stable and less easily upset than the activated sludge system.

Another object is to provide a method of sewage treatment in which the problem of sludge returns is considerably simplified, the sludge being simply returned and interchanged with the incoming sewage without any intervening treatment.

Another object is to provide a method of sewage treatment in which the need for waste sludge facilities is practically eliminated for, in the practical application of my novel process, it has been observed that no "build up" of sludge is encountered so that no sludge drying beds or other sludge disposal facilities are required.

Another object is to provide a sewage treatment method in which all or a part of the sludge may be returned and mixed with the raw sewage influent.

Another object is to provide a sewage treatment method in which the raw sewage is first subjected to aerobic decomposition and thereafter to anaerobic digestion.

Another object is to provide a method of the character set forth in the preceding object in which the sludge resulting from the anaerobic digestion of the waste is returned and mixed with the raw sewage influent.

With these and other objects in view which will become apparent from the following description, the invention will hereinafter be explained with reference to the drawings which accompany and form a part of this specification.

As previously stated, I have devised two methods whereby the raw sewage to be purified may be subjected to a combination of anaerobic and aerobic decompositions in order to achieve more rapid and more efficient treatment of the sewage. One of these methods, in which the raw sewage is subjected first to anaerobic digestion and thereafter to aerobic decomposition is shown in Fig. 1, while in Fig. 2 is shown a method in which the raw sewage is first subjected to aerobic decomposition and thereafter to anaerobic digestion.

Figure 1:
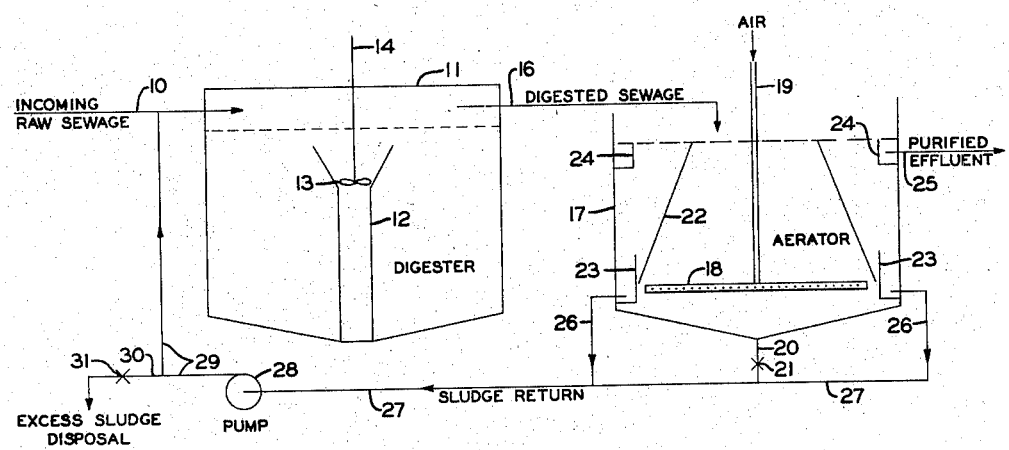
Fig. 1 is a diagrammatic view illustrating one method of carrying out my invention.
Figure 2:
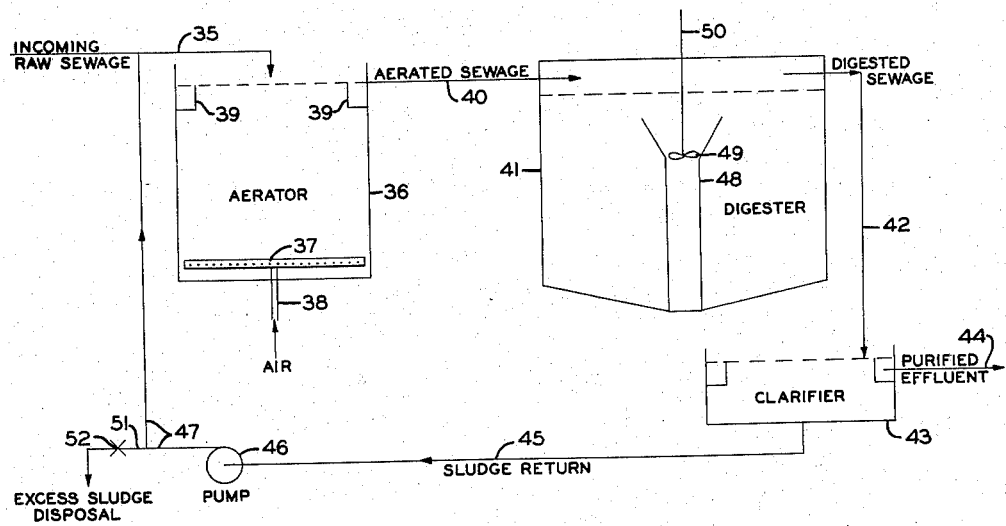
Fig. 2 is a diagrammatic view showing a second method of carrying out my invention.

Referring to Fig. 1, it will be seen that the raw sewage which is to be subjected to the anaerobic-aerobic method of treatment is discharged from a conduit 10, along with sludge, into a digestor 11 where the sewage and sludge are subjected to anaerobic digestion with or without heating. Whether or not heating will be required to effect rapid and efficient digestion of the sewage will depend upon the character of the sewage as well as the temperature of the same when delivered to the disposal plant. In the case of industrial waste, and particularly in the case of distillery waste, the average temperature of such waste is generally high enough to permit efficient digestion of the sewage without additional heating. Also, in the case of distillery waste, I have been able to obtain excellent results at much lower digestion temperatures than are usually considered desirable. Whereas most standard digestion tanks in use today operate at temperatures in the range of 90° to 100° F., I have obtained excellent results in the treatment of distillery waste using temperatures of from 70° to 80° F. So far, I have been unable to discover that any improvement results from heating the waste in the digestor to the standard range of 90° to 100° F.

After digestion of the sewage in the digester 11 has been completed, the effluent from the digestion tank, which is maintained in the form of a slurry by the stirring action of an impeller 13 carried on drive shaft 14 and operating in a draft tube 12, is passed through a conduit 16 into an aeration tank 17 where it is subjected to aerobic decomposition. The digested sewage is aerated in tank 17 by means of an air manifold 18 to which air under pressure is supplied through an air pressure line 19. The heavy particles of sludge formed during the aeration process will settle in the central portion of the tank and may be drawn off through a drain pipe 20 provided with a cut-off valve 21. The lighter particles of sludge will settle in the comparatively quiet zone lying outside a cone-shaped baffle plate 22 which is suspended centrally within the tank. This last-mentioned sludge will be collected in sludge concentrators 23 disposed around the outer wall of the tank near the bottom thereof. The effluent from the aerator 17 flows over weir plates 24 and may be carried off to the stream or other disposal medium through a discharge conduit 25.

The sludge settled in the concentrators 23 may be drawn off through conduits 26 which are connected to a sludge return line 27 connected to the intake side of a pump 28. The discharge side of the pump is connected by a conduit 29 with the influent conduit 10 so that the sludge drawn off from the concentrators 23 may be returned and interchanged with the incoming raw sewage entering the plant. The aerator drain pipe 20 containing cut-off valve 21 is likewise connected to the sludge return line 27 so that, when desired, the sludge collected in the bottom of the aerator 17 may be drained into the sludge return line and returned to the influent conduit 10.

In case it should be desirable to dispose of a part of the sludge collected from the aerator 17, a sludge discharge conduit 30 provided with a cut-off valve 31 is connected with the conduit 29 so that by opening the valve 31, the sludge can be discharged through the conduit 30 to sludge drying beds or other suitable sludge disposal means. I have found from practical experience with the anaerobic-aerobic process just described, that there is no tendency for the sludge to "build up" during continued operation of the process so that the sludge discharge conduit 30 will rarely if ever be used.

As an example of the performance which may be obtained with the anaerobic-aerobic process just described, results of tests made on two different days with a disposal plant using the method just described will be given.

*Example 1*

Distillery waste having a B. O. D. of 884 was digested for 13.4 hours at a temperature of 73% F. The digested waste was then aerated for 4.7 hours and thereafter settled for a suitable period of time after which the B. O. D. of the purified effluent was 9.9 a B. O. D. reduction of 98.8%. The sludge was tested and found to have a sludge index of 230.

*Example 2*

Raw distillery waste having a B. O. D. of 584 was digested 6.8 hours at a temperature of 78% F. The digested waste was then aerated for 2.4 hours and thereafter settled for a suitable period of time. The purified effluent had a B. O. D. of 3.4, a B. O. D. reduction 99.5%. The sludge was tested and found to have a sludge index of 34.

From the results of my experience with this anaerobic-aerobic process, it is believed that, in the case of distillery waste, it is readily possible to obtain better than 95% B. O. D. reduction with a system in which the waste is subjected to 8 hours of anaerobic digestion, 2½ hours of aeration, and 1½ hours of settling, to give a total of twelve hours retention time in the tanks. In contrast to this, it is well known that with a standard treatment plant for purifying distillery waste consisting of primary and secondary clarifiers, a trickling filter, and a digestor, the total retention time ranges from 18 to 30 hours. Since this longer retention time of a standard treatment plant requires proportionately larger tanks and equipment, this factor, together with the high initial cost of the trickling filter, indicates that the initial construction cost of my process may be from 25% to 75% less than that of the standard treatment system.

In both of the examples given above, a period of 1½ to 2 hours settling time should be adequate to provide satisfactory clarification of the liquor.

In Fig. 2 of the drawings is illustrated the flow diagram of a second process which follows the teachings of my invention. As shown in this figure, the mixed sewage and sludge is discharged from a conduit 35 into an aeration tank 36 where it is subjected to aerobic decomposition. The tank 36 is provided with an air manifold or diffuser 37 to which air is supplied through an air pressure line 38. The raw sewage is subjected to aeration and agitation in the tank 36 for approximately 2 to 8 hours after which it is discharged, in the form of a slurry, over the weir plates 39 and through a conduit 40 into a digestor 41. Here, the aerated sewage is digested for approximately 8 hours either with or without heating, as may be required, after which the digested sewage is discharged through a conduit 42 into a clarifier 43. The purified effluent from the clarifier is discharged through a disposal conduit 44 while the sludge settled out in the clarifier is drawn off through a sludge return line 45. The sludge return line 45 is connected with the intake side of a pump 46, the discharge side of which is connected by a conduit 47 with the influent conduit 35. Hence, the sludge drawn from the clarifier is interchanged with the incoming or influent raw sewage and mixed therewith in the aerator 36.

The digestor 41, may, like the digestor 11, shown in Fig. 1, be provided with a draft tube 48 in the upper end of which an impeller 49 operates on the lower end of a drive shaft 50. Also, as in the case of the system shown in Fig. 1, a part of the sludge from the clarifier 43 may be disposed of through a sludge discharge conduit 51 in which is located cut-off valve 52.

It will be noted that according to this second method of sewage treatment, the raw sewage is subjected first to aerobic decomposition in the aerator 36 after which it is subjected to anaerobic digestion in the digestor 41. The overflow from the digestor is then settled in the clarifier 43, the effluent from the clarifier being piped out of the plant for disposal in any suitable manner, while the sludge therefrom is returned and treated aerobically with the incoming raw sewage.

It will be understood that the apparatus shown and described herein and the examples of results achieved by the use of my invention are intended for purposes of illustration and exemplification only, and are not intended to restrict or limit the method utilized in conjunction therewith. It is, of course, to be realized that various changes and modifications might be resorted to in the type and arrangement of equipment used in carrying out my novel processes without departing from the spirit or the scope of the invention as defined by the claims appended hereto.

What I claim as new and useful and desire to secure by United States Letters Patent is:

1. The method of treatment of sewage to purify it comprising the steps of subjecting the raw sewage to aerobic decomposition, subjecting the effluent from said aerobic decomposition step to anaerobic digestion, feeding the sludge resulting from said anaerobic digestion step in with the influent raw sewage being subjected to aerobic decomposition, and agitating throughout the process the material being treated.

2. The method of treatment of sewage to purify it comprising the steps of subjecting the raw sewage to aerobic decomposition, subjecting the effluent from said aerobic decomposition step to anaerobic digestion, settling the effluent from said anaerobic digestion step, feeding the sludge settled out of the effluent in with the influent raw sewage being subjected to aerobic decomposition in said first step, and agitating throughout the process the material being treated.

3. The method of claim 2 including the step of agitating the said effluent while being subjected to the anaerobic digestion.

4. The method of treating sewage which consists in mixing the raw sewage with sludge to form a slurry, subjecting the slurry to anaerobic digestion with continuous agitation to maintain the solids in suspension, subjecting the anaerobically treated slurry to aerobic decomposition with continued agitation to maintain the solids in suspension, settling out the sludge from the aerobically treated slurry, and returning the sludge thus settled for mixing with the influent sewage.

5. The method of treating sewage which consists in mixing the raw sewage with sludge to form a slurry, subjecting the slurry to anaerobic digestion with continuous agitation to maintain the solids in suspension, subjecting the anaerobically treated slurry to aerobic decomposition by aeration thereof with continued agitation to maintain the solids in suspension, passing the aerated slurry to a quiescent zone to permit settling of the sludge, and returning the sludge thus settled for mixing with the influent sewage.

6. The process for the treatment of sewage comprising the steps of mixing the raw sewage influent with return sludge to form a slurry therewith, treating in separate stages substantially all of said slurry to both anaerobic digestion and aerobic decomposition with continuous agitation of the slurry during said treatment to maintain the solids in suspension, clarifying the treated slurry to settle out the suspended solids to yield a sludge and a purified effluent, and returning the sludge for mixing with the raw sewage influent.

7. The process of claim 6 in which the slurry formed from the raw sewage influent and the return sludge is subjected first to anaerobic digestion and thereafter to aerobic decomposition.

8. The process of claim 6 in which the slurry is first subjected to aerobic decomposition and then to anaerobic digestion.

References Cited in the file of this patent

UNITED STATES PATENTS

| | | |
|---|---|---|
| 699,345 | Provost | May 6, 1902 |
| 1,331,735 | Wilson | Feb. 24, 1920 |
| 1,982,246 | Fischer | Nov. 27, 1934 |
| 2,049,889 | Boniface | Aug. 4, 1936 |
| 2,158,918 | Townsend | May 16, 1939 |
| 2,263,451 | Bach | Nov. 18, 1941 |
| 2,337,686 | Sherman | Dec. 28, 1943 |
| 2,348,125 | Green | May 2, 1944 |
| 2,348,126 | Green | May 2, 1944 |
| 2,360,811 | Kelly et al. | Oct. 17, 1944 |
| 2,430,519 | Mallory | Nov. 11, 1947 |
| 2,442,241 | Koruzo et al. | May 25, 1948 |
| 2,458,163 | Hays | Jan. 4, 1949 |
| 2,517,792 | Kraus | Aug. 8, 1950 |
| 2,520,540 | Green | Aug. 29, 1950 |
| 2,553,228 | Yonner | May 15, 1951 |
| 2,574,685 | Baxter et al. | Nov. 13, 1951 |

FOREIGN PATENTS

| | | |
|---|---|---|
| 19,197 | Great Britain | of 1899 |

OTHER REFERENCES

Transcribed notes of introductory address at meeting of Joint Committee on Investigation of Mallory Process; Public Health School Building, University of Michigan, by E. B. Mallory; Aug. 5, 1943. 42 pages 6, 7 and 13 particularly relied upon.